United States Patent
Doms

(10) Patent No.: US 10,311,035 B2
(45) Date of Patent: Jun. 4, 2019

(54) DIRECT CUBE FILTERING

(71) Applicant: SAP SE, Walldorf (DE)

(72) Inventor: Andreas Doms, Dresden (DE)

(73) Assignee: SAP SE, Walldorf (DE)

( * ) Notice: Subject to any disclaimer, the term of this patent is extended or adjusted under 35 U.S.C. 154(b) by 657 days.

(21) Appl. No.: 14/976,063

(22) Filed: Dec. 21, 2015

(65) Prior Publication Data

US 2017/0177173 A1    Jun. 22, 2017

(51) Int. Cl.
*G06F 3/048*      (2013.01)
*G06F 16/22*      (2019.01)

(52) U.S. Cl.
CPC .................... *G06F 16/2272* (2019.01)

(58) Field of Classification Search
CPC .......... G06F 3/0482; G06F 3/0484; G06F 17/30525; G06F 17/30598
USPC ................................................ 715/825
See application file for complete search history.

(56) References Cited

U.S. PATENT DOCUMENTS

| | | | |
|---|---|---|---|
| 6,460,059 B1 * | 10/2002 | Wisniewski | G06F 17/246 715/205 |
| 7,324,991 B1 * | 1/2008 | Anjur | G06F 17/30536 |
| 8,370,770 B2 * | 2/2013 | Vance | G06F 3/04817 715/764 |
| 9,026,897 B2 * | 5/2015 | Zarras | G06F 3/04842 715/219 |
| 9,043,693 B2 * | 5/2015 | Baeck | G06F 17/246 715/212 |
| 2006/0080594 A1 * | 4/2006 | Chavoustie | G06F 17/246 715/218 |
| 2010/0251091 A1 * | 9/2010 | Jania | G06F 17/246 715/219 |
| 2010/0306128 A1 * | 12/2010 | Moffat | G06Q 40/06 705/36 R |
| 2014/0372932 A1 * | 12/2014 | Rutherford | G06F 17/246 715/776 |
| 2016/0034561 A1 * | 2/2016 | Sexton | G06F 17/30958 707/737 |
| 2017/0177173 A1 * | 6/2017 | Doms | G06F 3/0482 |
| 2018/0129513 A1 * | 5/2018 | Gloystein | G06F 16/26 |

* cited by examiner

*Primary Examiner* — David Phantana-angkool
(74) *Attorney, Agent, or Firm* — Buckley, Maschoff & Talwalkar LLC

(57) ABSTRACT

A system may include display of a plurality of values, each of the plurality of values associated with a respective combination of one of a first set of members of a first dimension and one of a second set of members of a second dimension, detection of a user selection of one or more of the displayed plurality of values, determination of a first one or more members of the first set of members and a second one or more members of the second set of members associated with the selected one or more values, and filtering of the displayed values based on the determined first one or more members and the second one or more members.

18 Claims, 10 Drawing Sheets

| | TIME | ▲All | | | | | |
|---|---|---|---|---|---|---|---|
| ACCOUNTALLOC | RESPONSIBILITY CENTER | ▼North America | United States | Canada | ▼EMEA | Germany | Italy |
| | PRODUCTALLOC | | | | | | |
| Unit Price | ▼All Products | 195.00 $ | 197.00 $ | 195.00 $ | 405.00 $ | 160.00 $ | 245.00 $ |
| | ▶Apparel | – | – | – | – | – | – |
| | Athletic Shirts | | | | | | |
| | Athletic Shorts | | | | | | |
| | ▼Footwear | 195.00 $ | 197.00 $ | 195.00 $ | 405.00 $ | 160.00 $ | 245.00 $ |
| | Tennis Shoes | 105.00 $ | 105.00 $ | 105.00 $ | 160.00 $ | 80.00 $ | 80.00 $ |
| | Running Shoes | 90.00 $ | 92.00 $ | 90.00 $ | 150.00 $ | 80.00 $ | 70.00 $ |
| | Soccer Shoes | – | – | – | 95.00 $ | 105.00 $ | 95.00 $ |
| | ▶Accessories | – | – | – | – | – | – |
| | Cap | | | | | | |
| | Hat | | | | | | |
| | UNASSIGNED | – | – | – | – | – | – |
| Units Sold | ▶All Products | 48,800 | 25,800 | 23,000 | 302,100 | 170,100 | 132,000 |
| | ▶Apparel | – | – | – | – | – | – |
| | ▶Footwear | 48,800 | 25,800 | 23,000 | 302,100 | 170,100 | 132,000 |
| | Tennis Shoes | 17,600 | 9,800 | 7,800 | 63,500 | 38,100 | 25,400 |
| | Running Shoes | 31,200 | 16,000 | 15,200 | 114,300 | 63,500 | 50,800 |
| | Soccer Shoes | – | – | – | 124,300 | 68,500 | 55,800 |
| | ▶Accessories | – | – | – | – | – | – |
| | UNASSIGNED | – | – | – | – | – | – |

FIG. 1

| Analysis Application | | | | | | | | |
|---|---|---|---|---|---|---|---|---|
| | | | | | Direct Filter | Visualize | Point of View | Bookmarks |
| | TIME | ▶All | | | | | | |
| | RESPONSIBILITY CENTER | ▶North America | United States | Canada | ▶EMEA | Germany | Italy | |
| ACCOUNTALLOC | PRODUCTALLOC | | | | | | | |
| Revenue | ▶All Products | 36.30 Million $ | 14.27 Million $ | 22.03 Million $ | 25.62 Million $ | 14.94 Million $ | 10.68 Million $ | |
| | ▶Apparel | .045 Million $ | 0.31 Million $ | 0.13 Million $ | 0.33 Million $ | 0.09 Million $ | 0.21 Million $ | |
| | ▶Footwear | 14.77 Million $ | 13.28 Million $ | 1.49 Million $ | 10.96 Million $ | 1.02 Million $ | 9.94 Million $ | |
| | ▶Accessories | 21.08 Million $ | 0.68 Million $ | 20.40 Million $ | 14.33 Million $ | 13.83 Million $ | 0.50 Million $ | |
| Unit Price | ▶All Products | 195.00 $ | 197.00 $ | 195.00 $ | 405.00 $ | 160.00 $ | 245.00 $ | |
| | ▶Footwear | 195.00 $ | 197.00 $ | 195.00 $ | 405.00 $ | 160.00 $ | 245.00 $ | |
| | Tennis Shoes | 105.00 $ | 105.00 $ | 105.00 $ | 160.00 $ | 80.00 $ | 80.00 $ | |
| | Running Shoes | 90.00 $ | 92.00 $ | 90.00 $ | 150.00 $ | 80.00 $ | 70.00 $ | |
| | Soccer Shoes | — | — | — | 95.00 $ | 105.00 $ | 95.00 $ | |
| Units Sold | ▶All Products | 48,800 | 25,800 | 23,000 | 302,100 | 170,100 | 132,000 | |
| | ▶Footwear | 48,800 | 25,800 | 23,000 | 302,100 | 170,100 | 132,000 | |
| | Tennis Shoes | 17,600 | 9,800 | 7,800 | 63,500 | 38,100 | 25,400 | |
| | Running Shoes | 31,200 | 16,000 | 15,200 | 114,300 | 63,500 | 50,800 | |
| | Soccer Shoes | — | — | — | 124,300 | 68,500 | 55,800 | |

FIG. 4

| | | TIME | ▶All | | | Direct Filter | Visualize | Point of View | Bookmarks |
|---|---|---|---|---|---|---|---|---|---|
| | | RESONSIBILITY CENTER | ▶North America | United States | Canada | | ▶EMEA | Germany | Italy |
| ACCOUNTALLOC | | PRODUCTALLOC | | | | | | | |
| Revenue | | ▶All Products | 36.30 Million $ | 14.27 Million $ | 22.03 Million $ | | 25.62 Million $ | 14.94 Million $ | 10.68 Million $ |
| | | ▶Apparel | .045 Million $ | 0.31 Million $ | 0.13 Million $ | | 0.33 Million $ | 0.09 Million $ | 0.21 Million $ |
| | | ▶Footwear | 14.77 Million $ | 13.28 Million $ | 1.49 Million $ | | 10.96 Million $ | 1.02 Million $ | 9.94 Million $ |
| | | ▶Accessories | 21.08 Million $ | 0.68 Million $ | 20.40 Million $ | | 14.33 Million $ | 13.83 Million $ | 0.50 Million $ |
| Unit Price | | ▶All Products | 195.00 $ | 197.00 $ | 195.00 $ | | 405.00 $ | 160.00 $ | 245.00 $ |
| | | ▶Footwear | 195.00 $ | 197.00 $ | 195.00 $ | | 405.00 $ | 160.00 $ | 245.00 $ |
| | | Tennis Shoes | 105.00 $ | 105.00 $ | 105.00 $ | | 160.00 $ | 80.00 $ | 80.00 $ |
| | | Running Shoes | 90.00 $ | 92.00 $ | 90.00 $ | | 150.00 $ | 80.00 $ | 70.00 $ |
| | | Soccer Shoes | — | — | — | | 95.00 $ | 105.00 $ | 95.00 $ |
| Units Sold | | ▶All Products | 48,800 | 25,800 | 23,000 | | 302,100 | 170,100 | 132,000 |
| | | ▶Footwear | 48,800 | 25,800 | 23,000 | | 302,100 | 170,100 | 132,000 |
| | | Tennis Shoes | 17,600 | 9,800 | 7,800 | | 63,500 | 38,100 | 25,400 |
| | | Running Shoes | 31,200 | 16,000 | 15,200 | | 114,300 | 63,500 | 50,800 |
| | | Soccer Shoes | — | — | — | | 124,300 | 68,500 | 55,800 |

FIG. 6

| Analysis Application | | | | | | | | |
|---|---|---|---|---|---|---|---|---|
| | | | | Direct Filter | Visualize | Point of View | Bookmarks | |
| | | TIME | ▶All | | | | | |
| | RESONSIBILITY CENTER | United States | Canada | | | | | |
| ACCOUNTALLOC | PRODUCTALLOC | | | | | | | |
| Unit Price | Tennis Shoes | 105.00 $ | 105.00 $ | | | | | |
| | Running Shoes | 92.00 $ | 90.00 $ | | | | | |
| Units Sold | Tennis Shoes | 9,800 | 7,800 | | | | | |
| | Running Shoes | 16,000 | 15,200 | | | | | |

*FIG. 7*

| Analysis Application | | | | | | | | |
|---|---|---|---|---|---|---|---|---|
| | | | | | Direct Filter | Visualize | Point of View | Bookmarks |
| | | TIME | ▶ All | | | | | |
| | RESONSIBILITY CENTER | United States | Canada | | | | | |
| ACCOUNTALLOC | PRODUCTALLOC | | | | | | | |
| Unit Price | Tennis Shoes | 105.00 $ | 105.00 $ | | | | | |
| | Running Shoes | 92.00 $ | 90.00 $ | | | | | |
| Units Sold | Tennis Shoes | 9,800 | 7,800 | | | | | |
| | Running Shoes ─810 | 16,000 | 15,200 }820 | | | | | |

| Analysis Application | | | | | | | | Direct Filter | Visualize | Point of View | Bookmarks |
|---|---|---|---|---|---|---|---|---|---|---|---|
| | | TIME | ▶ All | | | | | | | | |
| | RESONSIBILITY CENTER | United States | Canada | | | | | | | | |
| ACCOUNTALLOC | PRODUCTALLOC | | | | | | | | | | |
| Units Sold | Running Shoes | 16,000 | 15,200 | | | | | | | | |

400

DIRECT CUBE FILTERING

BACKGROUND

Enterprise software systems receive, generate and store data related to many aspects of a business enterprise. Conventional systems may encapsulate this data within multi-dimensional "cubes" in order to facilitate management and analysis thereof. These structures may include several dimensions and several dimension members per dimension.

Spreadsheet 10 of FIG. 1 displays a projection of a multi-dimensional cube. X-axis 12 of spreadsheet 10 represents members of Time and Responsibility Center dimensions, and Y-axis 14 represents members of Account and Product dimensions. Each of values 16 is associated with one member of each dimension based on its X-Y position.

A user may apply filtering to the displayed dimensions in order to reduce the number of displayed value. Typically, this filtering requires invoking a separate filter dialog which displays all members of each dimension. The user selects desired members and then closes the dialog. This metaphor is time-consuming and insufficiently intuitive.

BRIEF DESCRIPTION OF THE DRAWINGS

FIG. 1 is a view of a user interface according to some embodiments.

FIG. 4 is a view of a user interface according to some embodiments.

FIG. 6 is a view of a user interface according to some embodiments.

FIG. 7 is a view of a user interface according to some embodiments.

FIG. 8 is a view of a user interface according to some embodiments.

FIG. 9 is a view of a user interface according to some embodiments.

DETAILED DESCRIPTION

Figure 2:
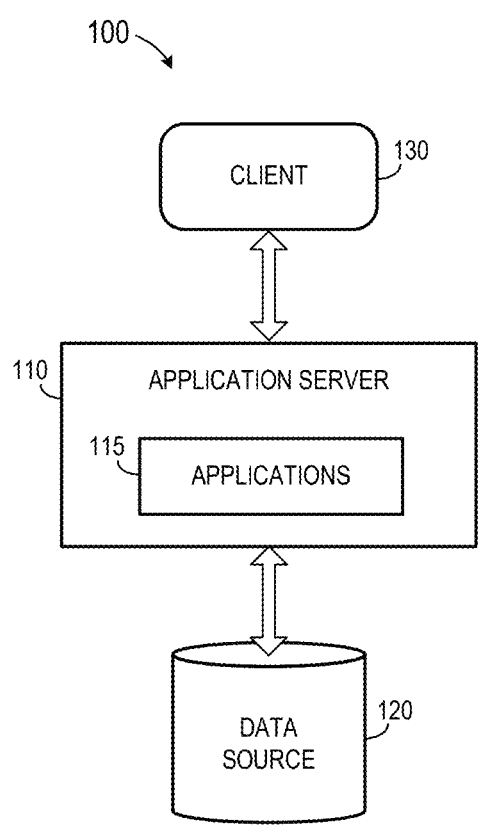
FIG. 2 is a block diagram of a system according to some embodiments.

FIG. 2 is a block diagram of system 100 according to some embodiments. FIG. 2 represents a logical architecture for describing processes according to some embodiments, and actual implementations may include more or different components arranged in other manners.

System 100 includes application server 110 to execute and provides services to applications 115. Applications 115 may comprise server-side executable program code (e.g., compiled code, scripts, etc.) which provide functionality to clients 130 by providing user interfaces to clients 130, receiving requests from clients 130, retrieving data from database 110 based on the requests, processing the data received from database 110, and providing the processed data to clients 130.

Application server 110 provides any suitable interfaces through which clients 130 may communicate with applications 115 executing on application server 110. For example, application server 110 may include a HyperText Transfer Protocol (HTTP) interface supporting a transient request/response protocol over Transmission Control Protocol (TCP), a WebSocket interface supporting non-transient full-duplex communications between application server 110 and any clients 130 which implement the WebSocket protocol over a single TCP connection, and/or an Open Data Protocol (OData) interface.

Data source 120 may comprise any one or more systems to store data and provide the data in response to suitable queries. The data stored in data source 120 may be received from disparate hardware and software systems, some of which are not interoperational with one another. The systems may comprise a back-end data environment employed in a business or industrial context. The data may be pushed to data source 120 and/or provided in response to queries received therefrom.

The data may comprise a relational database, an in-memory database, a multi-dimensional database, an eXtendable Markup Language (XML) document, and/or any other structured data storage system. Application server 110 queries data source 120 based on the query language supported by data source 120 (or by an intermediate data provider disposed between server 110 and data source 120). For example, application server 110 generates and transmits Multi-Dimensional eXpression (MDX) queries in a case that data source 120 is an OnLine Analytical Processing (OLAP) cube.

In some embodiments, data of data source 120 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Data source 120 may store metadata regarding the structure, relationships and meaning of the data stored therein. This information may include data defining the schema of database tables, which may be used by application server 110 to query data source 120. Data source 120 may also store metadata defining reports and instance data of the reports.

Data source 120 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Application server 110 may be separated from or closely integrated with data source 120. A closely-integrated application server 110 may enable execution of server applications 115 completely on database 120, without the need for an additional application server. For example, according to some embodiments, data source 120 includes a comprehensive set of embedded services which provide end-to-end support for Web-based applications. The services may include a lightweight web server, configurable support for OData, server-side JavaScript execution and access to SQL and SQLScript.

Client 130 may comprise one or more devices executing program code of a software application for presenting user interfaces to allow interaction with application server 110. Client 130 may comprise any suitable device, such as a desktop computer, a laptop computer, a personal digital assistant, a tablet PC, and a smartphone. The user interfaces may comprise user interfaces suited for reporting, data analysis, and/or any other functions based on data of data source 120.

Presentation of a user interface as described herein may comprise any degree or type of rendering, depending on the type of user interface code generated by application server 110. For example, client 130 may execute a Web Browser to request and receive a Web page (e.g., in HTML format) from application server 120 via HTTP, HTTPS, and/or Web-Socket, and may render and present the Web page according to known protocols. Client 130 may also or alternatively present user interfaces by executing program code of a data analysis (e.g., spreadsheet) application, a data analysis application with a plug-in allowing communication (e.g. via Web Services) with application server 110, a rich client application (e.g., a Business Intelligence tool), an applet in a Web browser, or any other application to perform the processes attributed thereto herein.

Although system 100 has been described as a distributed system, system 100 may be implemented in some embodiments by a single computing device. For example, both client 130 and application server 110 may be embodied by an application executed by a processor of a desktop computer, and data source 120 may be embodied by a fixed disk drive within the desktop computer.

Figure 3:
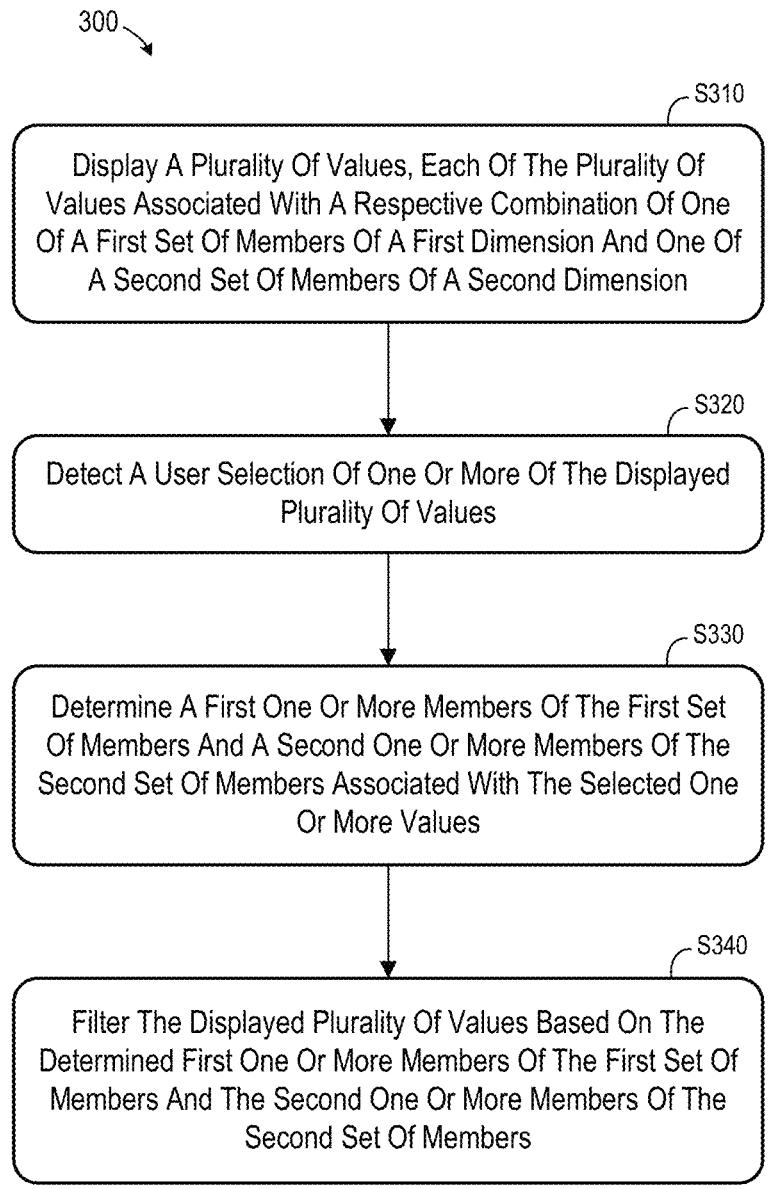
FIG. 3 is a flow diagram of a process according to some embodiments.

FIG. 3 comprises flow diagram of process 300 according to some embodiments. Process 300 may facilitate the filtering of displayed values in some embodiments. Various hardware elements of system 100 (e.g., one or more processors) may execute program code to perform process 300.

Process 300 and all other processes mentioned herein may be embodied in processor-executable program code read from one or more of non-transitory computer-readable media, such as a floppy disk, a disk-based or solid-state hard drive, CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to S310, a user operates client 130 to receive a result set from application server 110. To assist in the present description of an example of process 300, FIG. 4 shows a view of user interface 400 according to some embodiments. User interface 400 may be presented on a display of client 130 in response to execution of a Business Intelligence tool (e.g., Analysis Application) by a processor of client 130. Alternatively, user interface 400 may be a Web page displayed by a Web browser application executed by the processor. Embodiments are not limited to these examples.

According to the present example, it will be assumed that a user has manipulated user interface 400 to display visualization 410 at S310. Visualization 410 may be retrieved using any querying/reporting/analysis paradigm that is or becomes known according to some embodiments. In some examples, the user drags and drops one or more dimension members, measures or calculated values from a list into a layout window.

Visualization 410 is a table according to the illustrated embodiment, and may be generated by a spreadsheet application. Any type of visualization may be employed in conjunction with some embodiments.

Visualization 410 includes X-axis 412 representing the Time and Responsibility Center dimensions, and Y-axis 414 representing the Account and Product dimensions. More specifically, X-axis 412 includes six columns listing one of six members of the Responsibility Center dimension (North America, United States, Canada, EMEA, Germany and Italy) and one member of the Time dimension (All). In this regard, the Responsibility Center dimension and the Time dimension are both hierarchical (i.e., at least one dimension member includes at least one other dimension member), but embodiments are not limited thereto.

The first four rows along Y-axis 414 are associated with the member Revenue of the Account dimension and one of four members of the hierarchical Product dimension (i.e., All products, Apparel, Footwear and Accessories), and the second five rows are associated with the member Unit Price of the Account dimension and one of five members of the hierarchical Product dimension (i.e., All products, Footwear, Tennis Shoes, Running Shoes and Soccer Shoes). The last five rows along Y-axis 414 are associated with the member Units Sold of the Account dimension and one of five members of the hierarchical Product dimension (i.e., All products, Footwear, Tennis Shoes, Running Shoes and Soccer Shoes).

The rows and columns of visualization 410 define eighty-four cells. Each cell includes an aggregated value associated with a unique respective combination, defined by the cell's location, of one of the members of the Time dimension, one of the members of the Responsibility Center dimension, one of the members of the Account dimension and one of the members of the Product dimension.

A user selection of one or more of the displayed plurality of values is detected at S320. For example, the values of rows 430 are depicted in FIG. 4 as having been selected by user. Such selection may performed by placing a mouse cursor on a cell located at any corner of the selected area, clicking and holding a mouse button, moving the cursor to an opposite corner, and releasing the mouse button.

Rows 430 may be selected by individually selecting cells using a mouse cursor while holding down a SHIFT or CTRL key. Selection may also consist of selecting a row by selecting a header cell of the row, and selecting subsequent rows while holding down a SHIFT or CTRL key. Any user interface/input device metaphor for selecting values may be employed at S320 to select a plurality of values according to some embodiments.

Next, at S330, a plurality of dimension members is determined based on the selected values. S330 may be performed in response to a user trigger, such as selection of Direct Filter icon 420. More specifically, the unique combination of members determined by the cell's location is determined for each cell at S330. Since this determination is performed for each selected cell, S330 may comprise determining one or more members of each of the displayed dimensions.

With respect to the current example, and for each selected cell of rows 430, one member of the displayed members of the Responsibility Center dimension is determined, one member of the displayed the Time dimension member is determined, one member of the displayed members of the Account dimension is determined, and one member of the displayed members of the Product dimension is determined. As a result, the determined members are all six members of the Responsibility Center dimension, the sole member of the Time dimension, the members Footwear, Tennis Shoes, Running Shoes and Soccer Shoes of the Product dimension, and the member Units sold of the Account dimension.

Figure 5:
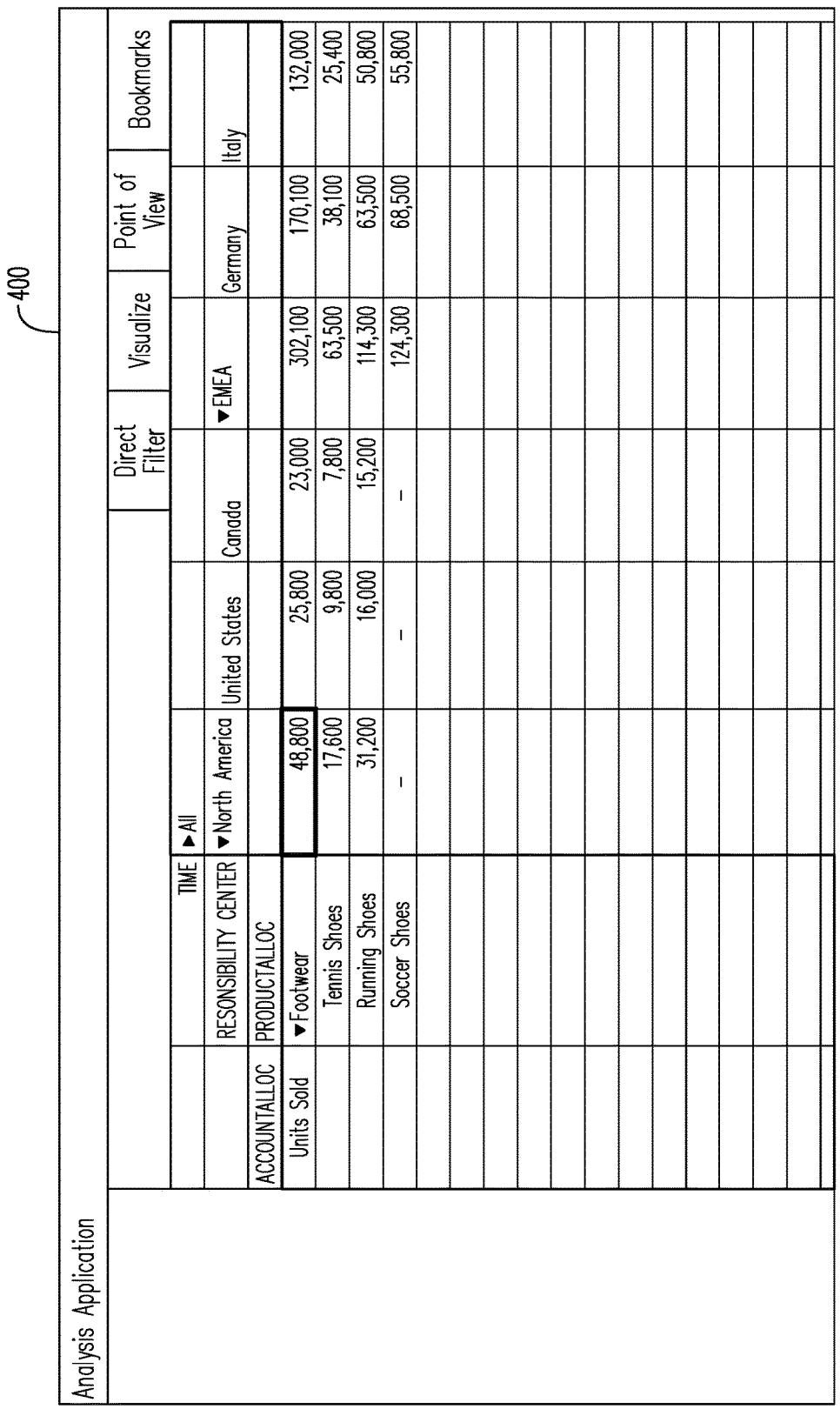
FIG. 5 is a view of a user interface according to some embodiments.

The displayed plurality of values is filtered at S340 based on the members determined at S330. FIG. 5 depicts the filtered values as displayed according to some embodiments.

As shown, the displayed values correspond to the dimension members determined in S330, thereby providing an efficient an intuitive filtering mechanism. According to some embodiments, flow may return to S320 from S340 to detect a user selection of a plurality of the filtered displayed values and to continue as described above to filter these values based on the user selection.

FIG. 6 depicts visualization 410 for the purpose of illustrating the selection of non-contiguous values at S320. The two selected values may be selected as described above by selecting one with a mouse or keyboard key combination, and, while depressing a CTRL key, selecting the other value in the same manner. Then, after selecting Direct Filter icon 420, a plurality of members associated with each selected value is determined at S330. According to the example, the determined members for value 610 are All, United States, Tennis Shoes and Unit Price, and the determined members for value 620 are All, Canada, Running Shoes and Units Sold. FIG. 7 depicts visualization 410 after filtering based on these determined dimension members at S340.

FIG. 8 illustrates another type of user selection which may be detected at S320 according to some embodiments. Specifically, selection of cell 810, which includes the Running Shoes dimension member, may be considered equivalent to selecting all the cells of row 820. These cells are also associated with the members Units Sold, All, United States and Canada. FIG. 9 illustrates visualization 410 after filtering at S340 based on these determined dimension members.

According to some embodiments, the filtering at S340 serves to filter out the selected cells such that the associated values do not appear in the resulting visualization. More specifically, filtering at S340 filters out the dimension member combinations of the selected cells. This mode allows a user to incrementally remove cells from the visualization until a desired result is displayed.

Figure 10:
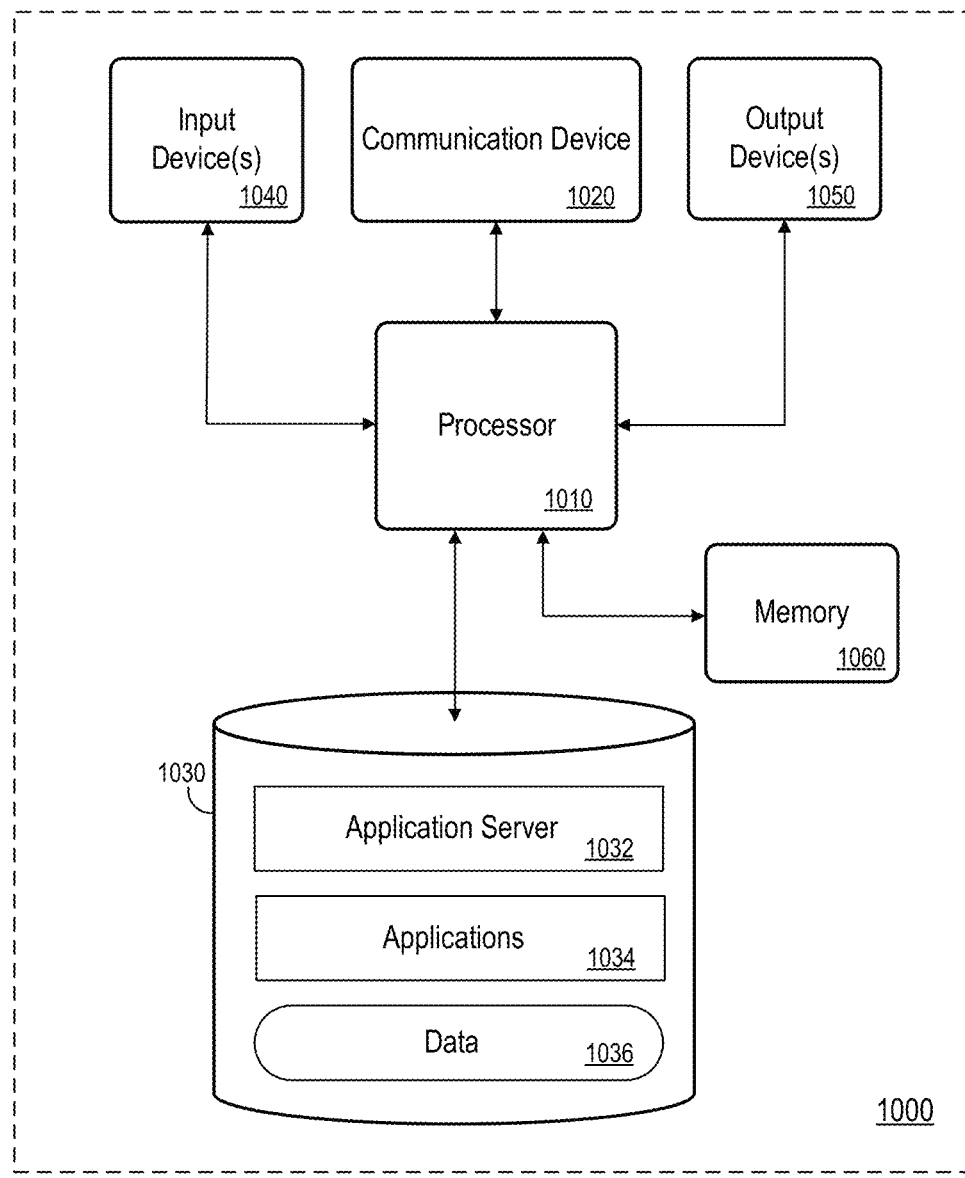
FIG. 10 is a block diagram of a computing device according to some embodiments.

FIG. 10 is a block diagram of apparatus 1000 according to some embodiments. Apparatus 1000 may comprise a general-purpose computing apparatus and may execute program code to perform any of the functions described herein. Apparatus 1000 may comprise an implementation of one or more elements of system 100, such as application server 110 and data source 120. Apparatus 1000 may include other unshown elements according to some embodiments.

Apparatus 1000 includes processor 1010 operatively coupled to communication device 1020, data storage device 1030, one or more input devices 1040, one or more output devices 1050 and memory 1060. Communication device 1020 may facilitate communication with external devices. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to enter information into apparatus 1000. Output device(s) 1050 may comprise, for example, a display (e.g., a display screen), a speaker, and/or a printer.

Data storage device 1030 may comprise any appropriate persistent storage device, including combinations of magnetic storage devices (e.g., magnetic tape, hard disk drives and flash memory), optical storage devices, Read Only Memory (ROM) devices, etc., while memory 1060 may comprise Random Access Memory (RAM).

Application server 1032 and applications 1034 of data storage device 1030 may comprise program code executable by processor 1010 to provide any of the functions described herein, including but not limited to process 300. Embodiments are not limited to execution of these functions by a single apparatus. Data 1036 may store associated data of data source 120 such as dimension members and measure values as described herein. Memory 1060 may also or alternatively store data of data source 120, with data storage device 1030 providing a persistent backup. Data storage device 1030 may also store data and other program code for providing additional functionality and/or which are necessary for operation thereof, such as device drivers, operating system files, etc.

Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method implemented by a computing system in response to execution of program code by a processor of the computing system comprising:
   displaying a plurality of values, each of the plurality of values associated with a respective combination of one of a first set of members of a first dimension and one of a second set of members of a second dimension;
   detecting a user selection of one or more of the displayed plurality of values;
   determining a first one or more members of the first set of members and a second one or more members of the second set of members associated with the selected one or more values; and
   filtering the displayed values based on the determined first one or more members and the second one or more members, directly without use of a separate filter dialog.

2. A method according to claim 1,
   wherein filtering the displayed plurality of values comprises displaying only those of the plurality of values which are associated with a combination of one of the first one or more members and one of the second one or more members.

3. A method according to claim 1,
   wherein filtering the displayed plurality of values comprises removing from the display only those of the plurality of values which are associated with a combination of one of the first one or more members and one of the second one or more members.

4. A method according to claim 1, wherein each of the plurality of values is associated with a respective combination of one of a first set of members of a first dimension, one of a second set of members of a second dimension, and one of a third set of members of a third dimension, further comprising:
 determining a first one or more members of the first set of members, a second one or more members of the second set of members, and a third one or more members of the third set of members associated with the selected one or more values; and
 filtering the displayed values based on the determined first one or more members, the second one or more members, and the third one or more members.

5. A method according to claim 4,
 wherein filtering the displayed plurality of values comprises displaying only those of the plurality of values which are associated with a combination of one of the first one or more members, one of the second one or more members, and one of the third one or more members.

6. A method according to claim 4,
 wherein filtering the displayed plurality of values comprises removing from the display only those of the plurality of values which are associated with a combination of one of the first one or more members, one of the second one or more members, and one of the third one or more members.

7. A non-transitory medium storing processor-executable program code, the program code executable by a processor of a computing device to:
 display a plurality of values, each of the plurality of values associated with a respective combination of one of a first set of members of a first dimension and one of a second set of members of a second dimension;
 detect a user selection of one or more of the displayed plurality of values;
 determine a first one or more members of the first set of members and a second one or more members of the second set of members associated with the selected one or more values; and
 filter the displayed values based on the determined first one or more members and the second one or more members, directly without use of a separate filter dialog.

8. A medium according to claim 7,
 wherein filtering the displayed plurality of values comprises displaying only those of the plurality of values which are associated with a combination of one of the first one or more members and one of the second one or more members.

9. A medium according to claim 7,
 wherein filtering the displayed plurality of values comprises removing from the display only those of the plurality of values which are associated with a combination of one of the first one or more members and one of the second one or more members.

10. A medium according to claim 7, wherein each of the plurality of values is associated with a respective combination of one of a first set of members of a first dimension, one of a second set of members of a second dimension, and one of a third set of members of a third dimension, the program code further executable by a processor of a computing device to:
 determine a first one or more members of the first set of members, a second one or more members of the second set of members, and a third one or more members of the third set of members associated with the selected one or more values; and
 filter the displayed values based on the determined first one or more members, the second one or more members, and the third one or more members.

11. A medium according to claim 10,
 wherein filtering of the displayed plurality of values comprises display of only those of the plurality of values which are associated with a combination of one of the first one or more members, one of the second one or more members, and one of the third one or more members.

12. A medium according to claim 10,
 wherein filtering of the displayed plurality of values comprises removal from the display only those of the plurality of values which are associated with a combination of one of the first one or more members, one of the second one or more members, and one of the third one or more members.

13. A system comprising:
 a computing device comprising:
 a memory storing processor-executable program code; and
 a processor to execute the processor-executable program code in order to cause the computing device to:
 display a plurality of values, each of the plurality of values associated with a respective combination of one of a first set of members of a first dimension and one of a second set of members of a second dimension;
 detect a user selection of one or more of the displayed plurality of values;
 determine a first one or more members of the first set of members and a second one or more members of the second set of members associated with the selected one or more values; and
 filter the displayed values based on the determined first one or more members and the second one or more members, directly without use of a separate filter dialog.

14. A system according to claim 13,
 wherein filtering the displayed plurality of values comprises displaying only those of the plurality of values which are associated with a combination of one of the first one or more members and one of the second one or more members.

15. A system according to claim 13,
 wherein filtering the displayed plurality of values comprises removing from the display only those of the plurality of values which are associated with a combination of one of the first one or more members and one of the second one or more members.

16. A system according to claim 13, wherein each of the plurality of values is associated with a respective combination of one of a first set of members of a first dimension, one of a second set of members of a second dimension, and one of a third set of members of a third dimension, the processor to execute the processor-executable program code in order to cause the computing device to:
 determine a first one or more members of the first set of members, a second one or more members of the second set of members, and a third one or more members of the third set of members associated with the selected one or more values; and
 filter the displayed values based on the determined first one or more members, the second one or more members, and the third one or more members.

17. A system according to claim 16,
wherein filtering of the displayed plurality of values comprises display of only those of the plurality of values which are associated with a combination of one of the first one or more members, one of the second one or more members, and one of the third one or more members.

18. A system according to claim 16,
wherein filtering of the displayed plurality of values comprises removal from the display only those of the plurality of values which are associated with a combination of one of the first one or more members, one of the second one or more members, and one of the third one or more members.

\* \* \* \* \*